United States Patent
Hegge et al.

(10) Patent No.: US 11,042,036 B2
(45) Date of Patent: Jun. 22, 2021

(54) DEVICE MOUNT FOR MIXED-REALITY CAPTURE

(71) Applicant: Microsoft Technology Licensing, LLC, Redmond, WA (US)

(72) Inventors: Nicholas Ryan Hegge, Woodinville, WA (US); Benedict Charles Frederic Reed, Kirkland, WA (US); Gabriela Susana Chennisi Duncombe, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 304 days.

(21) Appl. No.: 16/284,354

(22) Filed: Feb. 25, 2019

(65) Prior Publication Data

US 2020/0271939 A1  Aug. 27, 2020

(51) Int. Cl.
*G02B 27/01* (2006.01)
*G03B 17/56* (2021.01)

(52) U.S. Cl.
CPC ....... *G02B 27/0176* (2013.01); *G03B 17/561* (2013.01); *G03B 17/563* (2013.01); *G03B 17/566* (2013.01); *G02B 2027/0138* (2013.01); *G02B 2027/0154* (2013.01); *G02B 2027/0169* (2013.01); *G02B 2027/0196* (2013.01); *G03B 17/56* (2013.01)

(58) Field of Classification Search
CPC .................................................. H04N 5/2222
See application file for complete search history.

(56) References Cited

U.S. PATENT DOCUMENTS

| 9,958,680 B2* | 5/2018 | Liu ........................ G06F 3/013 |
| 10,747,009 B1* | 8/2020 | Sharma ................... G02B 3/08 |

OTHER PUBLICATIONS

Gibson, "HoloLens Spectator View Mount", available at https://www.thingiverse.com/thing:2196586 publication date Mar. 22, 2017 (Year: 2017).*
Gibson, "Panasonic GH4 Camera Cage", available at https://www.thingiverse.com/thing:2522425 publication date Sep. 7, 2017 (Year: 2017).*
Phandroid—Google Glass: Real Life Demo (Looking Through Glass); https://www.youtube.com/watch?v=jK3WLILYhQs dated May 9, 2013, screen captures attached (Year: 2013).*
Arvizio—https://www.newswire.ca/news-releases/arvizio-unveils-mr-studio-viewpoint-for-hololens-spectators-642866123.html dated Sep. 6, 2017 (Year: 2017).*

* cited by examiner

*Primary Examiner* — Clayton E. LaBalle
*Assistant Examiner* — Leon W Rhodes, Jr.
(74) *Attorney, Agent, or Firm* — Buckley, Maschoff & Talwalkar LLC (57) ABSTRACT

An apparatus includes a first support to fixedly support a wearable device comprising a substantially transparent display screen, a second support physically coupled to the first support, the second support to support a camera lens in a substantially fixed relation to the display screen, and an interface physically coupled to the first support and to the second support, the interface to removably attach the apparatus to a camera support system.

18 Claims, 6 Drawing Sheets

DEVICE MOUNT FOR MIXED-REALITY CAPTURE

BACKGROUND

A conventional mixed-reality system is capable of presenting a mixed-reality environment to a user. For example, a mixed-reality headset may allow a user to see portions of her actual environment while displaying images of virtual objects and user interface elements such that the virtual objects and user interface elements appear to be present within the actual environment. The headset may also deliver sounds to the user which are not otherwise present within the actual environment.

In mixed-reality capture, the built-in camera of a mixed-reality headset captures footage of a user's view through the headset. This footage may include virtual objects, user interface elements, and portions of the user's actual environment as described above. However, such footage is typically shaky and unsuitable for accurately representing the mixed-reality experience to a viewer. The headset may be mounted to a stable platform during mixed-reality capture to address this issue, but such an arrangement prevents live monitoring of the actual footage being captured.

DETAILED DESCRIPTION

The following description is provided to enable any person in the art to make and use the described embodiments. Various modifications, however, will remain apparent to those in the art.

During traditional mixed-reality capture, for example, a mixed-reality headset presents graphical elements on a substantially transparent display screen. A user wearing the headset views the display screen so as to see the graphical elements as well as any actual objects located on an opposite side of the display screen. A camera system located in the headset captures images (e.g., video footage) of the display screen from the user's perspective. Since the camera system and the user's eyes are not co-located, the camera system is calibrated to allow registration of the captured images from a reference frame of the camera system to a reference frame of the user.

According to some embodiments, an apparatus is provided to efficiently monitor images captured by a device such as a mixed-reality headset. The apparatus may include elements to support a display device (e.g., a mixed-reality headset) and to support an image capture device, such as a camera, in a substantially fixed relationship to a display screen of the display device. The image capture device and the camera system of the display device may be calibrated based on the substantially fixed relationship so that footage captured by the image capture device is suitably similar to footage captured by the camera system during mixed-reality capture. Footage captured by the image capture device may be transmitted to an external display during mixed reality capture, thereby providing an operator/observer with a live preview of the actual footage being captured by the camera system of the display device.

By facilitating a substantially fixed relationship between the image capture device and the display screen of the display device, embodiments may reduce a need for recalibration of the system in response to bumping or other physical movement of the system.

Some embodiments also provide features to facilitate stabilization of the captured footage. For example, an apparatus according to some embodiments may include an interface for attaching the mixed-reality display device to a camera support system. Examples of a camera support system include but are not limited to a stabilizer, a tripod, a drone, a dolly, a slider, and a jib.

According to some embodiments, the apparatus includes features to facilitate replacement of a first display device with another display device (e.g., another mixed-reality headset) such that the camera remains in the same substantially fixed relationship with respect to a display screen of the new display device. Such features may reduce a need for recalibration in response to device replacement (e.g., if the first display device requires recharging).

Figure 1:
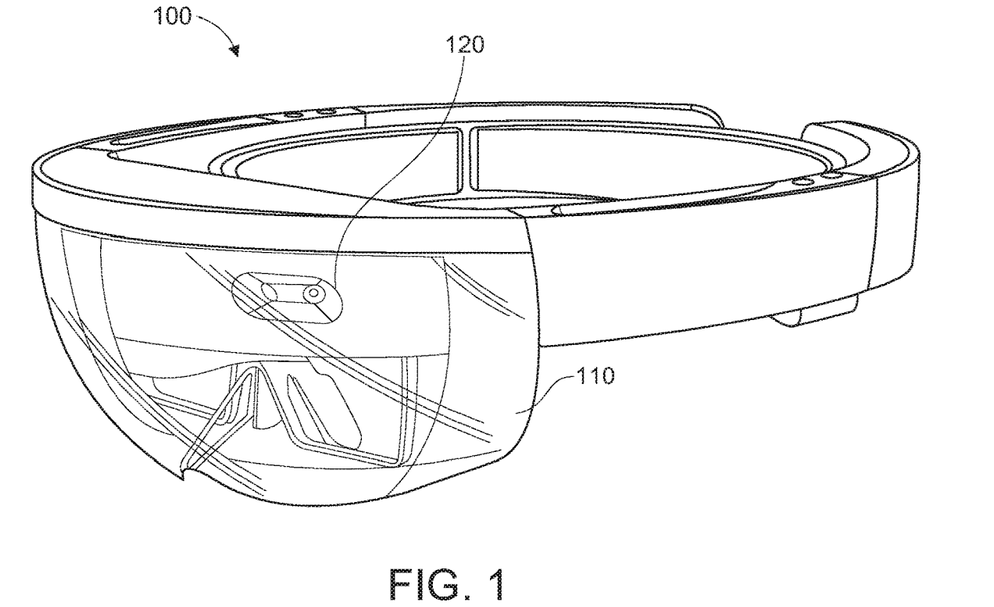
FIG. 1 depicts a mixed-reality headset according to some embodiments.

FIG. 1 is a view of wearable (i.e., head-mounted) mixed-reality device 100 according to some embodiments. Embodiments are not limited to device 100, and may utilize any past, current or future device capable of performing the functions attributed to device 100 herein.

Device 100 includes substantially transparent display screen 110 for presenting images to a wearer thereof. The images may completely occupy the wearer's field of view, or may be presented within the wearer's field of view such that the wearer may still view other objects in her vicinity. The images may be two-dimensional, three-dimensional, holographic, and/or any other type of presentable images that are or become known.

Device 100 also includes camera system 120 to capture images and video. The captured video may comprise mixed-reality capture footage as described above. Camera system 120 may also function as a sensor to assist, in conjunction with data from on-board accelerometers (not shown), in determining the position and motion of device 100 in three-dimensional space with six degrees of freedom.

Figure 2:
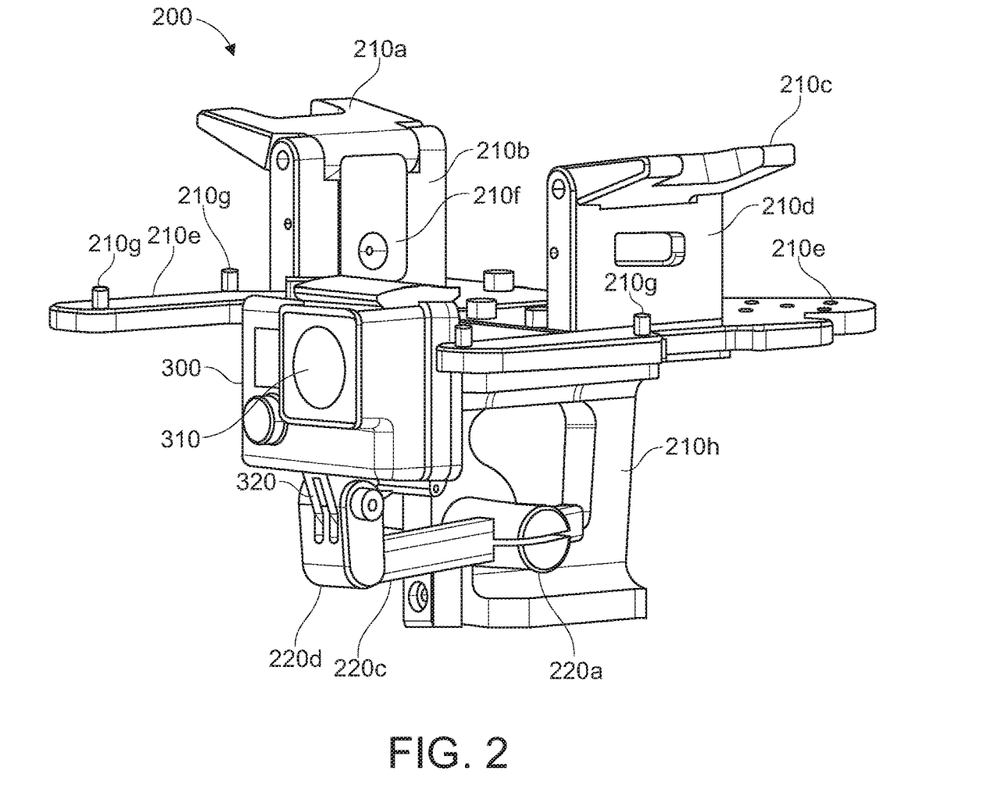
FIG. 2 depicts an apparatus and a camera mounted to the apparatus according to some embodiments.

FIG. 2 illustrates apparatus 200 to support a device such as device 100 according to some embodiments. Apparatus 200 also includes elements to support camera 300. As described above, Apparatus 200 may support a device 100 and camera 300 to maintain a substantially fixed relationship therebetween. The substantially fixed relationship may position lens 320 of camera 300 with respect to a display screen/lens of device 100 so as to acquire suitable live footage of mixed-reality video captured by device 100. Embodiments are not limited to use in conjunction with a camera having a form factor or of a type as illustrated in FIG. 2. The elements of apparatus 200 may comprise machined aluminum or any suitable one or more materials.

Elements operable to support device 100 are labeled in FIG. 2 using numeric convention 210x, while elements operable to support camera 300 are labeled using numeric convention 220x. For convenience, elements 210x will be referred to as comprising a "first support" and elements 220x will be referred to as comprising a "second support".

The first support includes a clamping mechanism consisting of engagement arm 210a and standoff 210b, and a similar clamping mechanism consisting of engagement arm 210c and standoff 210d. Each of standoffs 210b and 210d extend from surface 210e of the first support. Engagement arms 210a and 210c are rotatable around the couplings to their respective standoffs 210b and 210d to be disposed upward and substantially in parallel with their standoffs 210b and 210d, and to be disposed substantially perpendicular to their standoffs 210b and 210d. In the latter position, engagement arms 210a and 210c may engage portions of device 100 against surface 210e, thus contributing to fixedly supporting device 100 against the first support. Element 210f may comprise a quick-release button for releasing arm 210a, and therefore a corresponding engaged portion of device 100. Projections 210g extend from surface 210e and mate with corresponding features of device 100, as will be described below.

The second support includes rotatable element 220a, which is rotatably inserted into an opening of base 210h. Base 210h may therefore serve to couple the second support to the first support. Arm 220c is slidably inserted into element 220a and supports camera interface 220d. Interface 220d includes features to engage with corresponding features of mounting element 320 of (or coupled to) camera 300. As will be evident from the following figures and description, a position of camera lens 310 with respect to a display of device 100 may be adjusted via rotation of element 220a, sliding of arm 220c and rotation of element 320 within interface 220d, and then fixed using corresponding fixing mechanisms (e.g., screws).

Figure 3:
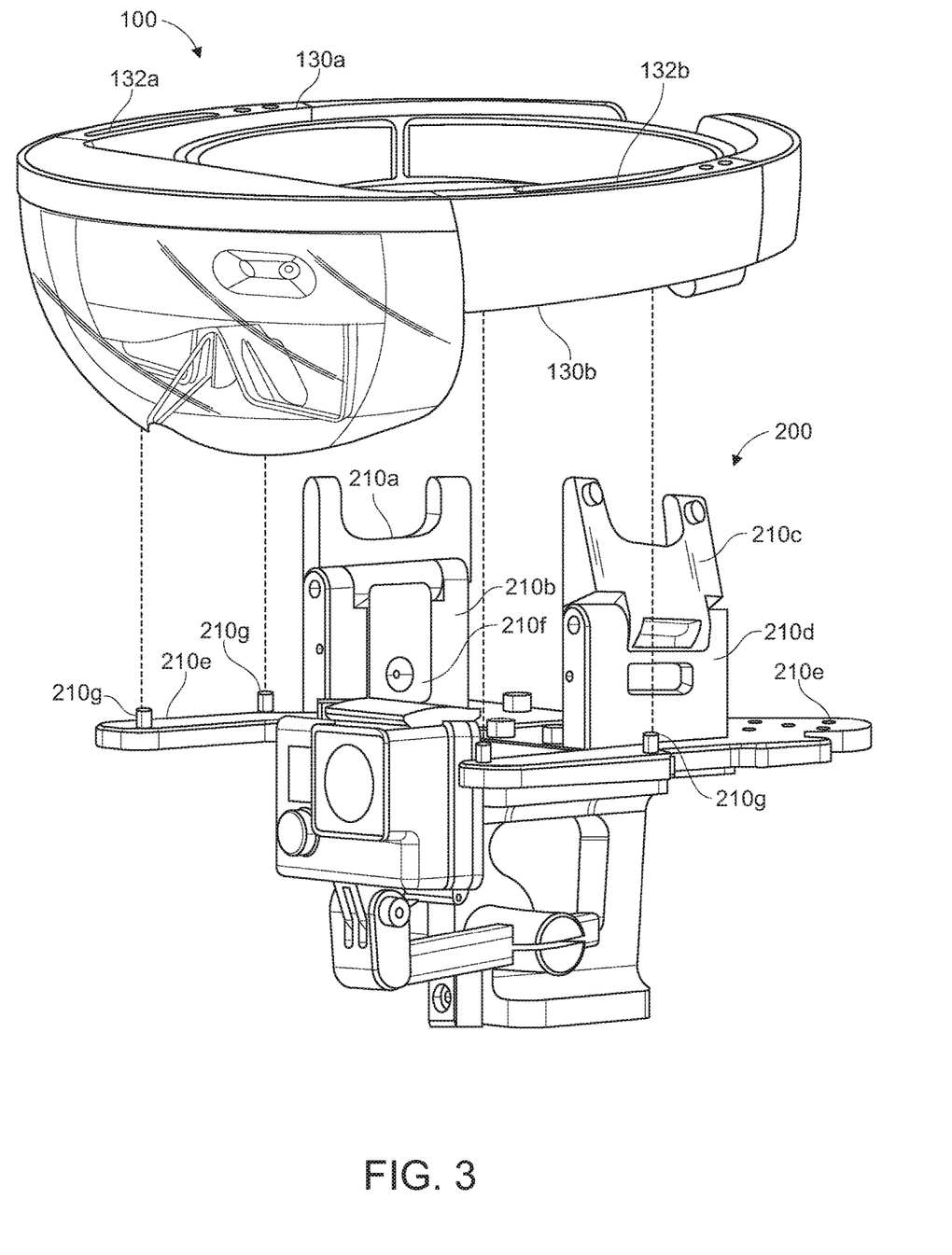
FIG. 3 illustrates mounting of a headset on an apparatus according to some embodiments.
Figure 4:
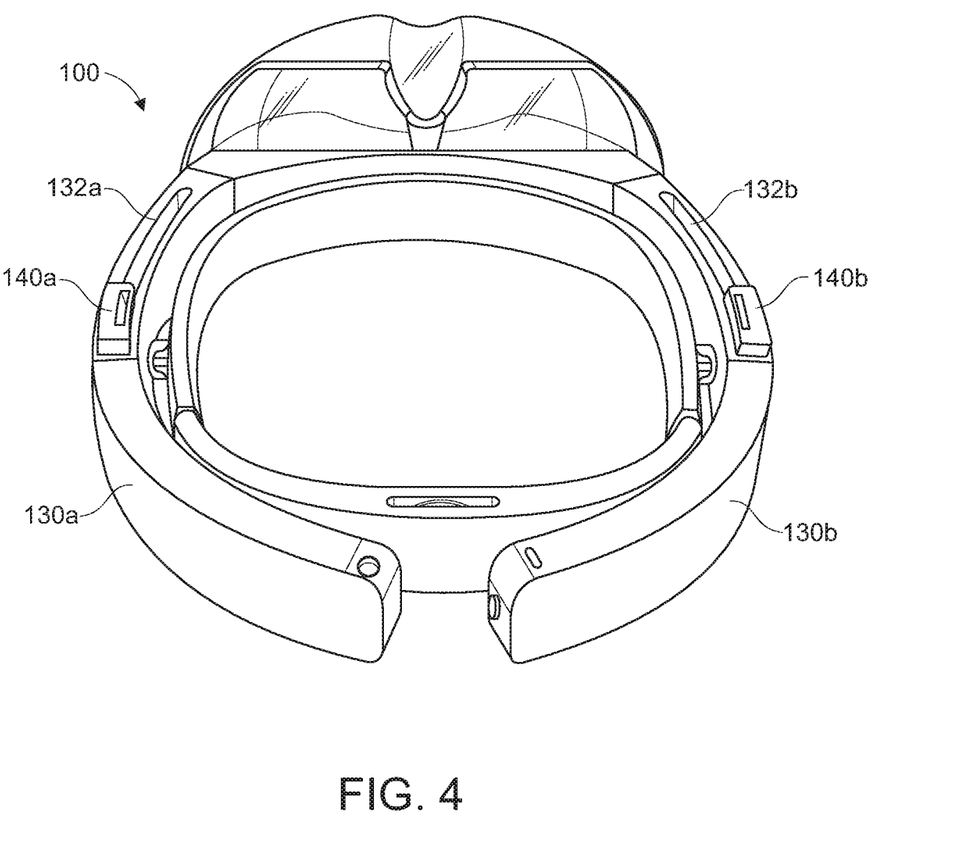
FIG. 4 is a bottom view of a headset according to some embodiments.

FIG. 3 illustrates placement of device 100 upon apparatus 200 according to some embodiments. Engagement arms 210a and 210c have been rotated away from surface 210e to facilitate lowering of device 100 onto surface 210e. As shown in FIG. 4, elements 130a and 130b of device 100 define respective channels 132a and 132b. Channels 132a and 132b are aligned with and mate with protrusions 210g as device 100 settles on surface 210e as shown in FIG. 3. Protrusions 210g may be sized and disposed with respect to channels 132a and 132b such that movement of device 100 parallel to the plane of surface 210e is limited while protrusions 210g are mated with channels 132a and 132b.

Figure 5:
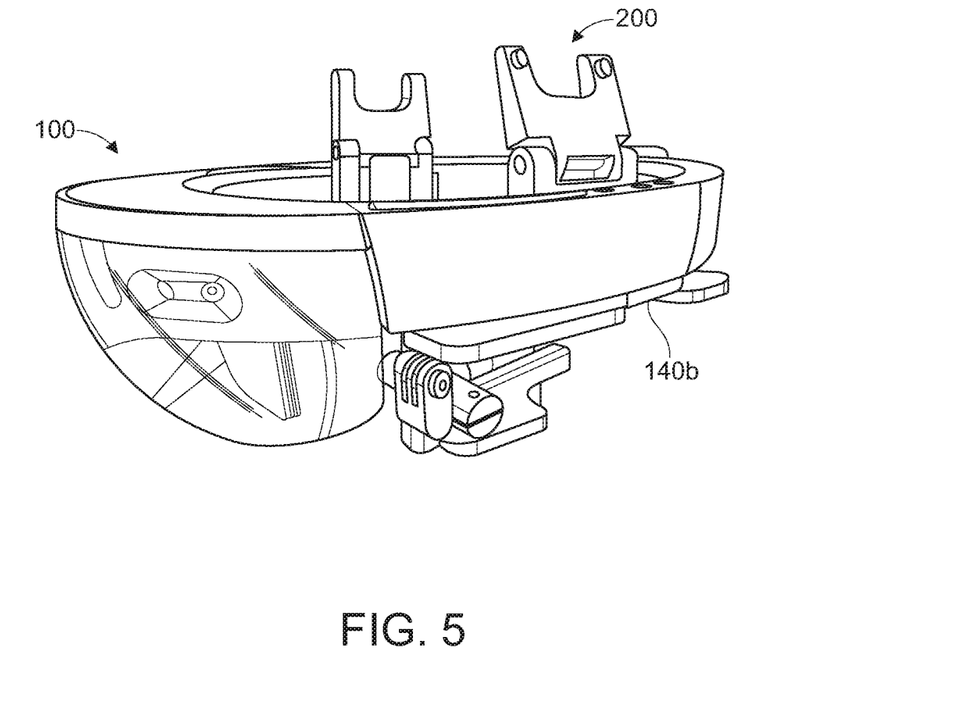
FIG. 5 illustrates mounting of a headset on an apparatus according to some embodiments.
Figure 6:
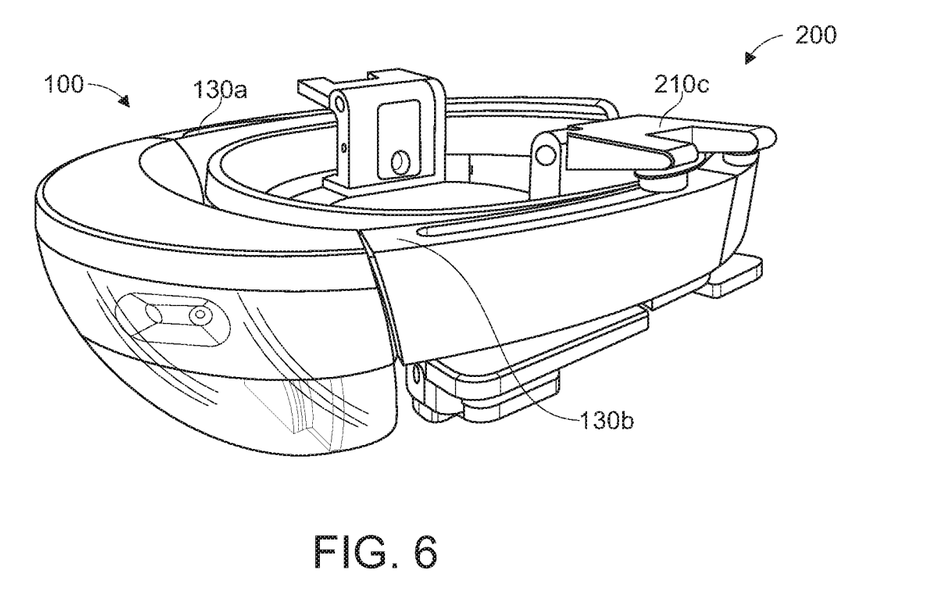
FIG. 6 depicts a mixed-reality headset mounted to an apparatus according to some embodiments.

Also shown in FIG. 4 are speaker elements 140a and 140b of device 100. As shown in FIG. 5, speaker elements 140a and 140b may be disposed within corresponding cutouts of apparatus 200 after device 200 is lowered onto surface 210e. FIG. 6 depicts arms 210a and 210c after being manually rotated toward surface 210e to fixedly engage elements 130a and 130b against surface 210e. Each of arms 210a and 210c may be coupled to standoffs 210b and 210d by a locking hinge which locks (or resists rotation in an opposite direction) in response to being rotated to a particular angle. The particular angle may be selected to result in secure fixing of device 100 to apparatus 200. As mentioned above, the locking hinge may comprise a quick-release mechanism to selectively unlock the hinge (e.g., prior to removing device 100 from apparatus 200).

The foregoing features may thereby operate to fix device 100 in a known position with respect to apparatus 200 and to fix camera 300 in a known position with respect to apparatus 200. Embodiments of the foregoing features may thereby create a substantially fixed relationship between an image capture device (e.g., camera 300) and the display screen of a display device (e.g., device 100). The fixed relationship may facilitate live monitoring of mixed-reality capture as described above.

Once device 100 is secured to apparatus 200 as shown in FIG. 6, lens 310 of camera 300 may be located at a position similar to the position of a left eye of a hypothetical wearer of device 100. It is therefore assumed that a left side of display screen 110 of device 100 is configured to display virtual elements (and to allow light from actual objects to pass through) to a left eye of a wearer. Embodiments may position camera 300 at a position similar to the position of a right eye of a hypothetical wearer of device 100, which would require corresponding changes to apparatus 200 as depicted herein.

Figure 7:
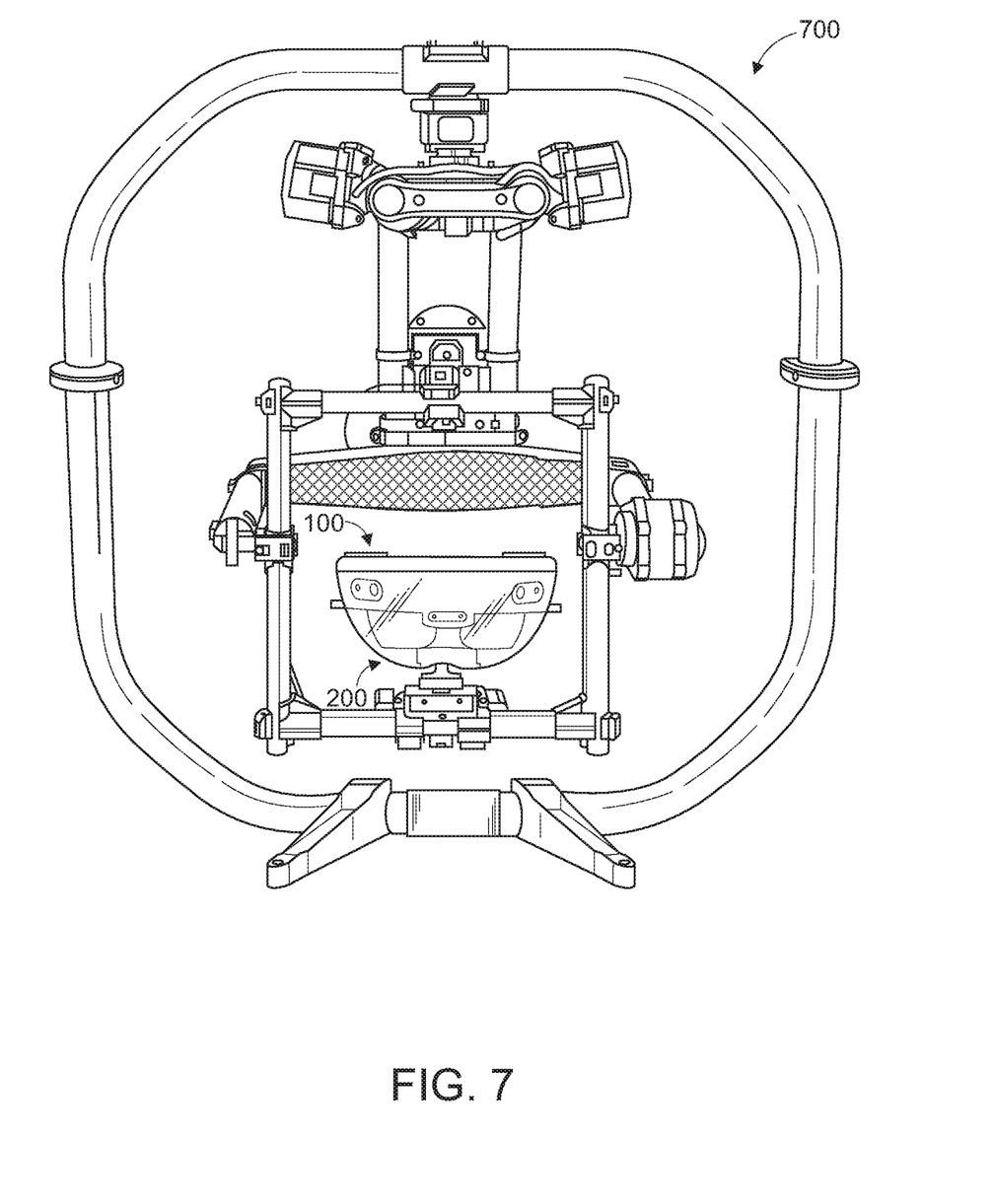
FIG. 7 depicts an apparatus supporting a mixed-reality headset and mounted to a camera stabilization device according to some embodiments.

FIG. 7 illustrates apparatus 200 attached to a camera support system according to some embodiments. Camera support system 700 may comprise a stabilization system, but embodiments are not limited thereto. As described below and illustrated in subsequent figures, apparatus 200 may comprise an interface compatible with standard camera support systems. Such an interface may include one or more screw holes compatible with 1/4"×20 and/or 3/8"×16 screws.

According to some examples, an operator may operate device 100 to initiate mixed-reality capture using a camera system of device 100. The operator may also operate camera 300 to begin capturing images and outputting the images (e.g., wirelessly) to an external display. Camera 300 may be positioned with respect to a display screen of device 100 such that the images captured by the camera system of device 100 are, after calibration, substantially identical to images output by camera 300, although image settings, quality and/or format may differ therebetween. During mixed-reality capture, the operator may move system 700 to change the position and/or orientation of device 100 in three-dimensional space. Such movement should not negatively affect the suitability of the images output by camera 300 during mixed-reality capture, due to the secure fixing of device 100 and camera 300 to apparatus 200.

Figure 8:
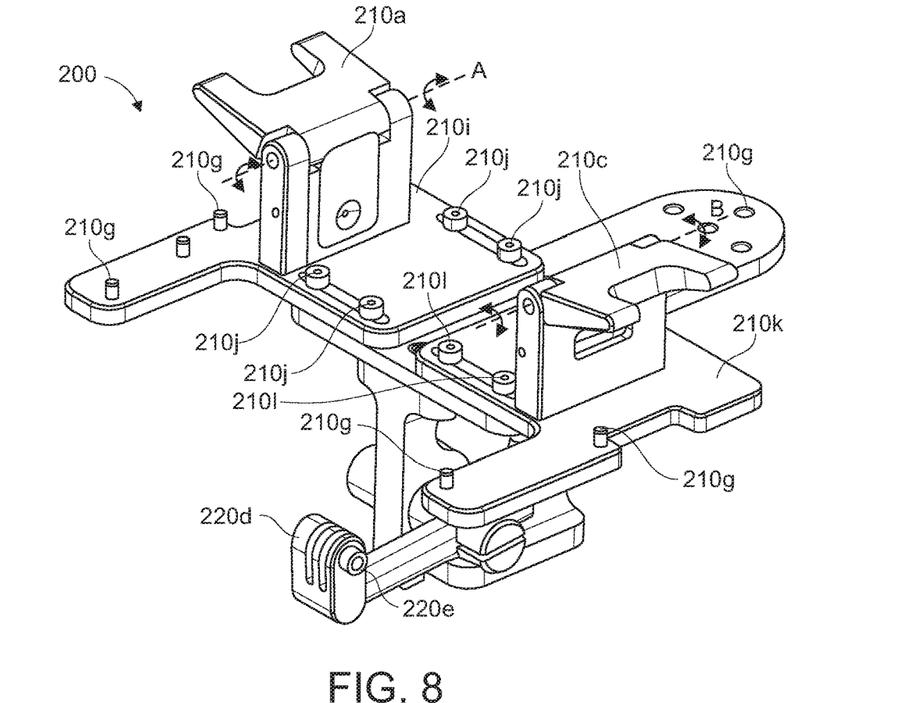
FIG. 8 is a top right view of an apparatus according to some embodiments.

FIG. 8 is a top right view which depict axes A and B around which arms 210a and 210c may respectively rotate. FIG. 8 also shows separate elements 210i and 210k, each of which supports a corresponding one of arms 210a and 210c and two protrusions 210g. According to some embodiments, screws 210j and 210l may be loosened to slide their respective elements 210i and 210k toward and away from each other, and tightened to fix the spacing therebetween. Such adjustment changes the spacing between arms 210a and 210c and the two protrusions 210g of each of elements 210i and 210k, thereby allowing apparatus to accommodate headsets of different widths.

Accessory area 210g includes screw holes to mount any suitable accessories, such as weights, battery packs, and lighting. FIG. 8 also shows screw 220e, which may be removed to allow insertion of element 320 into interface 220d and reinserted to fix element 320 therein.

Figure 9:
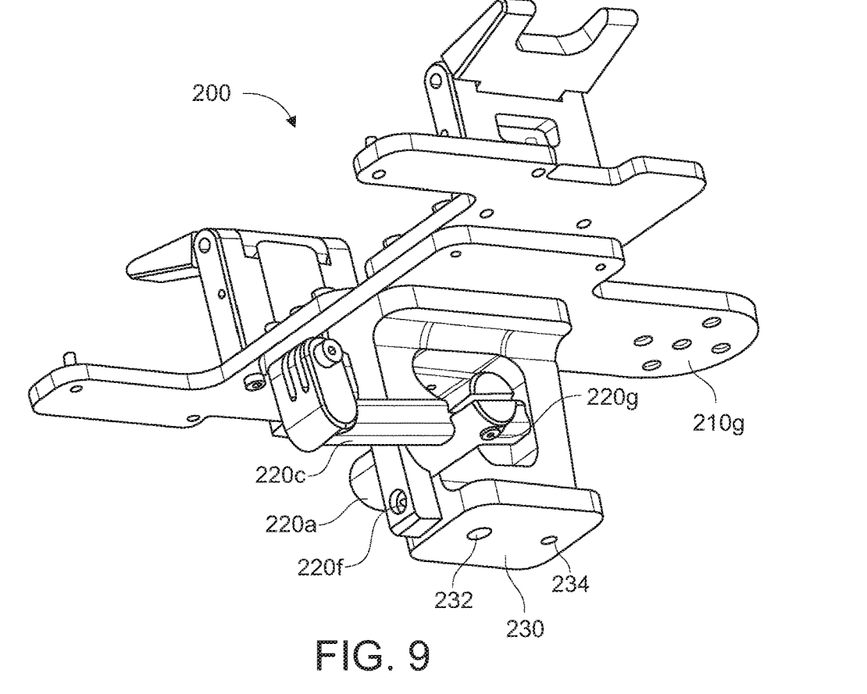
FIG. 9 is a bottom right view of an apparatus according to some embodiments.

FIG. 9 is a bottom right view of apparatus 200. Shown are the underside of accessory area 210g and camera support interface 230. As mentioned above, interface 230 includes screw hole 232 to accommodate a 3/8"×16 and screw hole 234 to accommodate a 1/4"×20 screw.

Screw 220f may be loosened to allow rotational adjustment of element 220a, and screw 220g may be loosened to allow for sliding of arm 220c in and out of element 220a. Embodiments are not limited to the particular arrangement described herein for adjusting a position and an orientation of a camera with respect to other elements of apparatus 200.

The figures and descriptions herein provide examples of some embodiments. Each element described herein may be composed of any number of suitable elements, and multiple elements may be implemented by a single element where suitable. Any element described herein may be composed of any one or more suitable materials, and elements are not necessarily composed of identical materials. Elements described as performing a function or providing a characteristic may be substituted with any other one or more elements to perform the function or provide the characteristic.

Those in the art will appreciate that various adaptations and modifications of the above-described embodiments can be configured without departing from the claims. Therefore, it is to be understood that the claims may be practiced other than as specifically described herein.

What is claimed is:

1. An apparatus comprising:
   a first support to fixedly support a wearable device comprising a substantially transparent display screen;
   a second support physically coupled to the first support, the second support to support a camera lens in a substantially fixed relation to the display screen to capture images of graphic elements displayed by the display screen and of objects located on a side of the display screen opposite from the camera; and
   an interface physically coupled to the first support and to the second support, the interface to removably attach the apparatus to a camera support system.

2. An apparatus according to claim 1, the first support comprising:
   one or more protrusions to mate with channels defined by earpieces of the wearable device; and
   one or more clamping mechanisms to engage the earpieces against a surface of the first support.

3. An apparatus according to claim 2, the second support comprising:
   an arm to support a camera, the arm movable independent of the first support to move the camera lens of the camera to a position in a second substantially fixed relation to the display screen to capture images of graphic elements displayed by the display screen and of objects located on the side of the display screen opposite from the camera.

4. An apparatus according to claim 3, the first support comprising one or more elements adjustable to fixedly change a distance between two or more of the protrusions.

5. An apparatus according to claim 4, wherein the interface comprises ¼"×20 and ⅜"×16 screw holes.

6. An apparatus according to claim 1, the first support comprising:
   one or more quick-release clamps to engage earpieces of the wearable device against a surface of the first support.

7. An apparatus according to claim 6, wherein the one or more quick-release clamps comprise two or more quick-release clamps, and the first support comprising:
   one or more elements adjustable to fixedly change a distance between two or more of the quick-release clamps.

8. A method comprising:
   securing a wearable device comprising a substantially transparent display screen to a first support to fixedly support the wearable device;
   securing a camera to a second support physically coupled to the first support, the camera secured in a substantially fixed relation to the substantially transparent display screen;
   operating the wearable device to display graphic elements on the transparent display screen; and
   while operating the wearable device to display graphic elements on the transparent display screen, and while the camera remains secured in the substantially fixed relation to the substantially transparent display screen, operating the camera to capture images of the displayed graphic elements and of objects located on a side of the transparent display screen opposite from the camera.

9. A method according to claim 8, further comprising:
   while operating the camera to capture images of the graphic elements and of the objects located on the side of the transparent display screen opposite from the camera, operating the wearable device to capture images of the graphic elements and of the objects located on the side of the transparent display screen opposite from the camera.

10. A method according to claim 8, further comprising:
    releasing one or more quick-release clamps of the first support to disengage the wearable device from the first support; and
    engaging the one or more quick-release clamps to secure a second wearable device comprising a second substantially transparent display screen to the first support to fixedly support the second wearable device in the substantially fixed relation to the camera.

11. A method according to claim 10, further comprising:
    operating the second wearable device to display graphic elements on the second transparent display screen; and
    while operating the second wearable device to display graphic elements on the second display screen, and while the camera remains secured in the substantially fixed relation to the second display screen, operating the camera to capture images of the displayed graphic elements and of objects located on a side of the second display screen opposite from the camera.

12. A method according to claim 8, wherein securing the wearable device comprises:
    mating one or more protrusions of the first support with channels defined by earpieces of the wearable device; and
    engaging one or more clamping mechanisms of the first support to engage the earpieces against a surface of the first support.

13. A method according to claim 12, wherein securing the camera comprises:
    securing the camera to an arm of the second support; and
    moving the arm independent of the first support to move the camera to a position in the substantially fixed relation to the display screen.

14. A method according to claim 8, wherein securing the wearable device comprises:
    engaging one or more quick-release clamps of the first support to engage the wearable device against a surface of the first support.

15. An apparatus comprising:
    support elements to support a camera lens in a substantially fixed position with respect to a substantially transparent display screen of a wearable device, the camera lens in the substantially fixed position to capture images of graphic elements displayed by the display screen and of objects located on a side of the display screen opposite from the camera; and adjustment elements to change the substantially fixed position to a second substantially fixed position, the camera lens in the second substantially fixed position to capture images of graphic elements displayed by the display screen and of objects located on the side of the display screen opposite from the camera.

16. An apparatus according to claim 15, the apparatus further comprising:
an interface physically coupled to the support elements, the interface to removably attach the apparatus to a camera support system.

17. An apparatus according to claim 16, wherein one or more of the support elements is repositionable to a position allowing removal of the wearable device from the support elements and placement of a second wearable device on the support elements, and is repositionable to support a substantially transparent display screen of the second wearable device in the substantially fixed position with respect to the camera lens, the camera lens in the substantially fixed position to capture images of graphic elements displayed by the display screen of the second wearable device and of objects located on the side of the display screen of the second wearable device opposite from the camera.

18. An apparatus according to claim 15, the support elements comprising:
one or more protrusions to mate with channels defined by earpieces of the wearable device; and
one or more clamping mechanisms to engage the earpieces against a surface of the first support.

* * * * *